United States Patent [19]
Barabash et al.

[11] Patent Number: 4,965,882
[45] Date of Patent: Oct. 23, 1990

[54] METHOD FOR OPERATING A PARALLEL PROCESSING SYSTEM AND RELATED APPARATUS

[75] Inventors: William Barabash, Acton; William S. Yerazunis, Hudson, both of Mass.

[73] Assignee: Digital Equipment Corporation, Maynard, Mass.

[21] Appl. No.: 103,364

[22] Filed: Oct. 1, 1987

[51] Int. Cl.$^5$ .................. G06F 15/18; G06F 15/16
[52] U.S. Cl. .................................... 364/513; 364/200; 364/274.5; 364/274.3; 364/274.2; 364/274.1; 364/274; 364/276.5; 364/276.8; 364/276.9
[58] Field of Search ... 364/200 MS File, 900 MS File, 364/300, 513

[56] References Cited

U.S. PATENT DOCUMENTS

| | | | |
|---|---|---|---|
| 4,635,199 | 1/1987 | Muraki | 364/419 |
| 4,779,208 | 10/1988 | Tsuruta et al. | 364/513 |
| 4,837,735 | 6/1989 | Allen, Jr. et al. | 364/513 |

OTHER PUBLICATIONS

Anderson et al., "The Architecture of FAIM-1", IEEE Computer, Jan. 1987, pp. 55-65.
Hills et al., "Data Parallel Algorithms", Communications of the ACM, vol. 29, No. 12, pp. 1170-1183, 1986.
Gupta et al., "High-Speed Implementations of Rule--Based Systems", ACM Transactions on Computer Systems, vol. 7, No. 2, pp. 119-146, 1989.
OPS5 User's Manual, Charles L. Forgy, Technical Report, CMU-CS-81-135, Carnegie-Mellon Univ., Pittsburgh, PA, Jul., 1981.
"Rete: A Fast Algorithm for the Many Pattern/Many Object Pattern Match Problem", Artificial Intelligence, vol. 19, Sep., 1982.

*Primary Examiner*—Gareth D. Shaw
*Assistant Examiner*—Kevin A. Kriess
*Attorney, Agent, or Firm*—Finnegan, Henderson, Farabow, Garrett, and Dunner

[57] ABSTRACT

A method for operating a parallel processor system implements a beta-partitioning algorithm. According to that method, groups of working memory elements are identified which satisfy each of the conditions of all of several production rules. Then, sequences of sets are formed each corresponding to one of the production rules. The sets represent combinations of working memory elements which satisfy some or all of the conditions for the corresponding production rule. At some point during the formation of sets, the sets are subdivided into relatively equal-size subsets, each of which is assigned to a different processor. Each processor, which previously had been performing the same operations as the other processors, continues processing only its assigned subset.

40 Claims, 5 Drawing Sheets

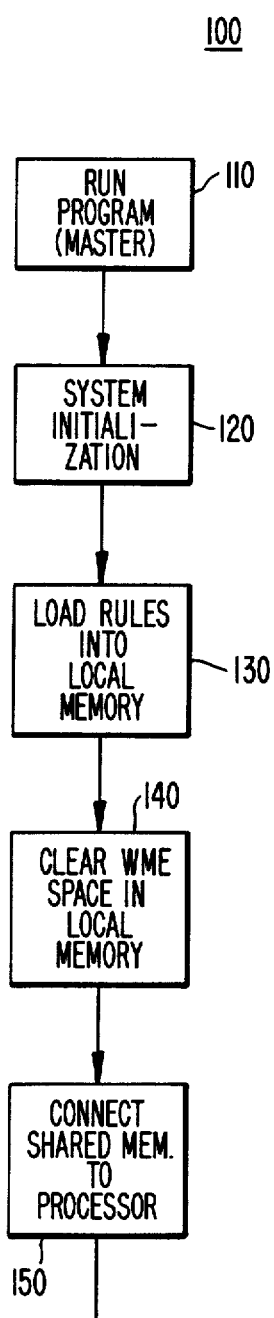
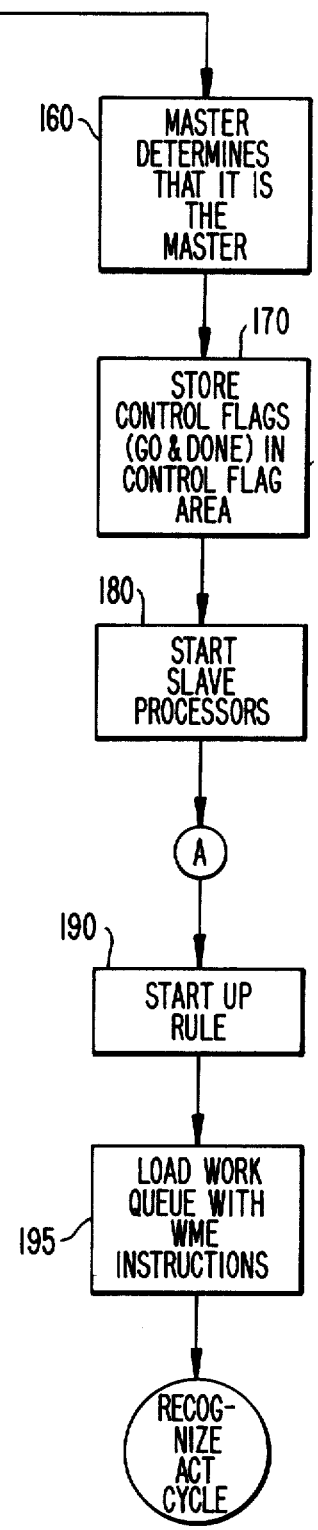
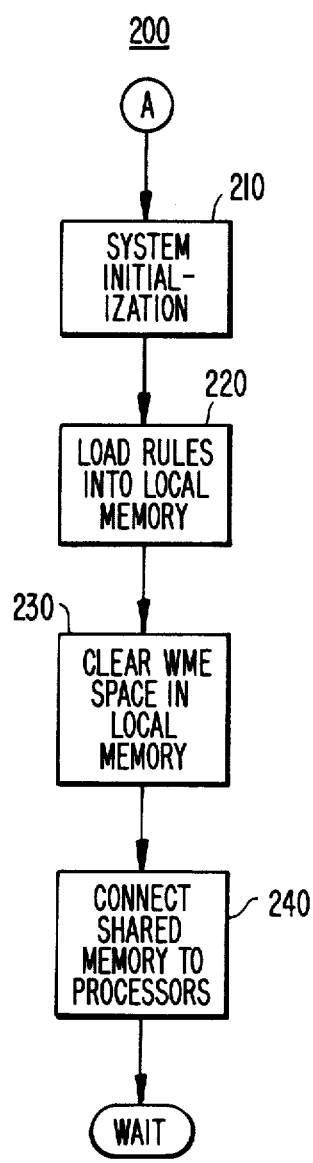
FIG. 3.
FIG. 4.

METHOD FOR OPERATING A PARALLEL PROCESSING SYSTEM AND RELATED APPARATUS

I. BACKGROUND OF THE INVENTION

A. Field of the Invention

This invention relates to parallel processing systems in general and specifically to such systems containing rule-based software.

B. Background Information

Systems in which several data processors are linked together to perform computational steps simultaneously are known as parallel processing systems. Parallel processing systems are used to reduce the time required to perform such computational steps. This is very helpful in artificial intelligence applications which perform numerous computations to simulate human cognitive thought. In order to recreate the real-time features of human thought, those computations must be performed at very high speeds.

The basic computations performed by a rule-based artificial intelligence system are searches among "working memory elements" (WMEs). Each WME is a set of related data, such as the age, sex, height, weight, and address of an individual. The WMEs, however, are not necessarily related to each other, nor are they ordered with respect to each other.

The searches are organized according to various "production rules." A "production rule" comprises a set of "conditions" and a set of "operations." The operations are enabled to be performed when the conditions are satisfied. A condition is satisfied when a WME specified by the condition exists, and when the data of the WME meets various criteria specified by the condition. The criteria may be, for example, mathematical (e.g., equality, less than, greater than) or of some other type. When the conditions of a production rule are satisfied, the processing system may perform the "operations" for that rule. Those operations may include causing an output or modifying, creating, or deleting other WMEs.

"Production rules," also referred to as "productions," are usually stored in a memory along with the WMEs. The parallel processors perform in the computational steps specified by the production rules.

Production rules may be "if-then" rules of the type used in connection with OPS5 programs described in *OPS5-User Manual*, Charles L. Forgy, Technical Report CMU-CS-81-135, Computer Science Department, Carnegie Mellon University, Pittsburgh, Pa., July 1981, which is herein incorporated by reference. When they are stored in memory, each production rule contains (1) an indication that the rule is a production rule, (2) the name of the rule, (3) a "left-hand" or "if" side which specifies the "conditions," and (4) a "right-hand" or "then" side which indicates "operations" to be performed when a rule's conditions have been satisfied.

Often, the conditions specified in a rule are satisfied by more than one set of working memory elements. For example, if the rule had as its conditions (1) a man and (2) a woman, and if the WMEs included data on the residents of an apartment building, then there would likely be several combinations of WMEs, (i.e., pairings of one man and one woman) which would satisfy the conditions of that rule. When this occurs, the operations specified by that rule can be performed according to some priority determined by the WMEs which satisfied the rule. Furthermore, in a case of conflict when all the conditions of several rules have been satisfied, the rule having the highest priority is the one whose operations are subsequently performed.

A "recognize-act cycle" refers to the set of steps wherein (1) conditions of production rules are satisfied by the working memory elements, (2) the satisfied production rule with the highest priority is determined, and (3) the "then" side actions of the rule with highest priority are performed. The recognize-act cycle is typically the basic set of functional steps for a parallel processor system.

An example of a production rule is:

```
(P PRODNAME
  (C1   attribute1  value1)
  (C2   attribute2  value2   attribute3  value3)
  →
  (OPER1)).
```

This rule is exemplary of the production rules used in OPS5 programs. The symbol P indicates that the rule is a production rule (as distinguished from any other rule recognizable by a parallel processing system). The name of the rule is PRODNAME. Left-hand side conditions of the rule are shown with "class" indicators C1 and C2 and specify WMEs.

Attributes, such as attribute1 and attribute2, refer to other data associated with the WMEs which meet the corresponding condition. For example, if a condition was "male," an attribute might be hair color. Value1, value2, and value3 are the values of the corresponding attributes which must be met to satisfy the condition. The attributes and values together thus specify "condition tests," which are the criteria referred to above. The operation, OPER1, is performed when conditions C1 and C2 and the associated conditions tests are satisfied. One or more corresponding WMEs may exist for each condition of an indicated class, specified attributes, and associated values.

Those corresponding WMEs are stored in a memory accessible by the parallel processor for performing the computational steps of production rule PRODNAME. These WMEs may have been stored in the memory during initialization, or they may have been created as a result of an operation performed at the conclusion of a previous recognize-act cycle.

The processor(s) performing the computational steps of a rule access(es) WMEs stored in a memory to identify which of those WMEs satisfy production rule conditions. For the production rule listed above, a processor will evaluate each WME available to it at the end of a previous recognize-act cycle to find any WMEs which satisfy "(C1  attribute1  value1) or (C2  attribute1  value2  attribute2  value3)." If the processor finds at least one WME corresponding to each of the conditions of the production rule, the rule is satisfied and can be "fired."

The number of WMEs which satisfy any given condition of a rule may vary widely for different production rules. The processor(s) performing the processing or computational steps for a rule typically keep(s) track of the WMEs satisfying each condition of the rule. This is necessary because the determination of whether a WME can satisfy a later condition may depend on which WMEs satisfied an earlier condition. A processor typically has processing software to keep track of the order in which each WME was most recently created or modified. One means of keeping track involves "time tags," which identify each WME according to the relative time of most recent creation or modification. Both the information regarding the different WMEs which satisfy a condition and the time tag for WMEs may be used to determine the priority of rules.

Production rule PRODNAME described above, has only two conditions C1 and C2. In general, however, a rule may have many more than two conditions.

One approach to implement this type of rule processing is the Rete Match Algorithm, described in Charles L. Forgy, "Rete: A Fast Algorithm For The Many Pattern/Many Object Pattern Match Problem," *Artificial Intelligence,* Vol. 19, September, 1982, which is herein incorporated by reference. According to the Rete Match Algorithm, each WME tested and found to satisfy any given condition of a rule, except the first condition, is stored as an "alpha token" in a portion of memory referred to as "alpha memory." Several alpha tokens may exist which correspond to a single satisfied condition of a single rule. For each WME which satisfies the first condition of a rule, a "beta token" is created and stored.

According to the Rete Match Algorithm, for each beta token satisfying a first condition of a rule, an alpha token is sought to satisfy a second condition of that rule. The production rule can only fire if an alpha token satisfying the second condition exists and if a beta token satisfies the first condition. Without also satisfying the second condition, satisfaction of the first condition will not allow the production rule to fire.

If a beta token for the first condition and an alpha token for the second condition exist, then the production rule is partially satisfied as to those two conditions, and the partial satisfaction of the production rule for those conditions can be preserved in the form of another beta token stored in a beta memory corresponding to the combined first and second conditions. In a similar manner, beta tokens are stored for each group of successive conditions, starting with the first condition, that are satisfied. These beta tokens are propagated to successive beta memories for each successive condition each time an alpha memory provides an alpha token satisfying the next condition of a rule. When a beta token is stored in the last beta memory, indicating that every condition of a production rule has been satisfied, the rule is ready for firing.

Since for any condition several alpha tokens satisfying that condition may exist, several combinations of alpha tokens may result in a rule being ready to fire. The specific working memory elements or alpha tokens satisfying a condition may have a bearing on the priority of a rule. Accordingly, satisfaction of each rule is sought with each beta token and each alpha token in order to maintain the highest possible priority for a rule.

Many computational steps are required to determine whether and in how many ways any one rule is satisfied by the sets of beta and alpha tokens. Typical production systems process several thousand production rules causing a great number of computational steps to be performed.

To manage this load, there have been attempts used to distribute the computational tasks across parallel processors and reduce the time required for processing production rules. One approach is known as the "rule-parallelism" approach. According to this approach, each production rule is assigned to only one of the parallel processors on the system. The rules are divided approximately equally among the processors. For example, if there were 8000 rules and 4 parallel processors, each processor is assigned a nonoverlapping subset of 2000 rules.

Each processor independently tests all the working memory elements to see which ones satisfy the conditions of the rules in its subset. At the end of each recognize-act cycle, priority among the fully satisfied rules is determined and the operations specified by the highest priority rule are performed.

Despite the relatively equal division of rules among processors with this approach, rule-parallelism does not ensure equality in the number of tasks to be performed by processors. Certain processors may have rules for which many WMEs satisfy the specified conditions, while other processors may be assigned rules having relatively few condition-satisfying WMEs. Accordingly, when the processors assigned rules with few corresponding WMEs are completed, the other processors will still be processing rules. Thus, there may be task inequality and little reduction in processing time. Furthermore, because different rules may have the same conditions, redundant testing of WMEs will result.

Another approach, known as condition-parallelism, has been implemented to overcome the problems experienced with the rule-parallelism. According to condition-parallelism, only one processor tests WMEs for each condition specified in a rule. Since the difference between WMEs satisfying any two conditions is much less likely to be as large as the difference between WMEs satisfying any two rules, the task inequity from condition-parallelism is less likely to be as great as in rule-parallelism.

Condition-parallelism, however, imposes interprocessor communication overhead. Any given processor which tests WMEs to satisfy a condition must communicate each beta token for the satisfied condition to the processor performing the test for the next condition of a rule. Communication overhead result each time a processor must wait for the beta token associated with a previous condition or retrieve a beta token from a communication link.

Another approach is known as "token-parallelism." This approach is an extension of condition-parallelism and equally distributes tests at junctions or "nodes" between beta memories and alpha memories to determine whether an alpha token exists for an existing beta token. Substantially simultaneous processing is also achieved by this approach, but again at the cost of having to provide greater processor communication overhead. In fact, since the computational steps are divided at an even more basic level than with condition-parallelism, the processor communication overhead is even greater for token-parallelism.

It is, therefore, an objective of the present invention to provide a method for operating a parallel processing system which ensures substantially equal distribution of computational tasks across processors and reduces the time required for processing production rules, regardless of any variation in the number of condition-satisfying working memory elements available for satisfying different rules.

It is another objective of the present invention to provide a processing method which does not experience substantial interprocessor synchronization delays and communication overhead.

It is a further object of the present invention to provide a processing method which minimizes the total amount of data to be communicated between processors during a recognize-act cycle.

It is yet another object of the present invention to provide a processing method which does not require a large shared memory for use by each of the system processors.

Additional objectives and advantages of the present invention will be set forth in part in the description which follows and in part will be obvious from that description or may be learned by practice of the invention. The objectives and advantages of the invention may be realized and obtained by the methods and apparatus particularly pointed out in the appended claims.

II. SUMMARY OF THE INVENTION

To achieve the objectives and in accordance with the purpose of this invention, as embodied and broadly described herein, a method according to the present invention uses a limited number of parallel processors, each of which has access to all the production rules and all the WMEs. At some point during the rule processing, however, the beta tokens or memory elements are divided into disjoint subsets and spread among the processors. Each processor continues processing its disjoint subset of beta memory elements until all of the rules have been evaluated against all the WMEs.

More specifically, the present invention includes a method for operating a parallel processing system having a first number of processors. The processors have access to working memory elements representing data to be examined, and the processors implement production rules. The production rules specify operations to be performed by the processors when a series of conditions associated with the production rules are satisfied by specific ones of the working memory elements. The method comprises the step of identifying groups of working memory elements by each of the processors substantially simultaneously. Each of the groups corresponds to a unique one of the conditions of the production rules, and all of the elements in each group satisfy that corresponding condition.

Another step in the method of this invention is the formation of first sets of pairs of working memory elements from the groups by each processor substantially simultaneously. Each of those sets coresponds to a unique one of the production rules, and the elements in each of the pairs in the first sets respectively satisfy first and second conditions of the corresponding production rule.

The method also comprises a step of forming a sequence of next sets of working memory elements by each processor, substantially simultaneously, from the groups of working memory elements. Each of the sequences is associated with at least one of the production rules such that the next set in each sequence corresponds to the next one of a series of conditions for the associated production rule. Each of the sets in each of the sequences contains working memory elements contained in a prior set in that sequence, as well as working memory elements from groups which satisfy the corresponding condition in the associated production rule.

Each processor, substantially simultaneously, also subdivides a selected one of the sets in each of the sequence into unique, non-overlapping subsets having approximately the same size. Each of the subsets corresponds to a different processor and thereafter each processor only forms the sets in each sequence succeeding from the corresponding subset.

Then, according to the method of the invention, all the operations specified by one of the production rules, for which all of the conditions have been satisfied, are performed.

The accompanying drawings, which are incorporated in and which constitute a part of this specification, illustrate an embodiment of the invention and, together with the description, explain the principles of the invention.

III. A BRIEF DESCRIPTION OF THE DRAWINGS

FIG. 3 is a flowchart containing steps for implementing a process for start-up of a master processor;

FIG. 4 is a flowchart containing steps for implementing a process for start-up of each slave processor;

IV. DESCRIPTION OF THE PREFERRED EMBODIMENT

Reference will now be made in detail to a presently preferred embodiment of the invention, examples of which are illustrated in the accompanying drawings.

Figure 1:
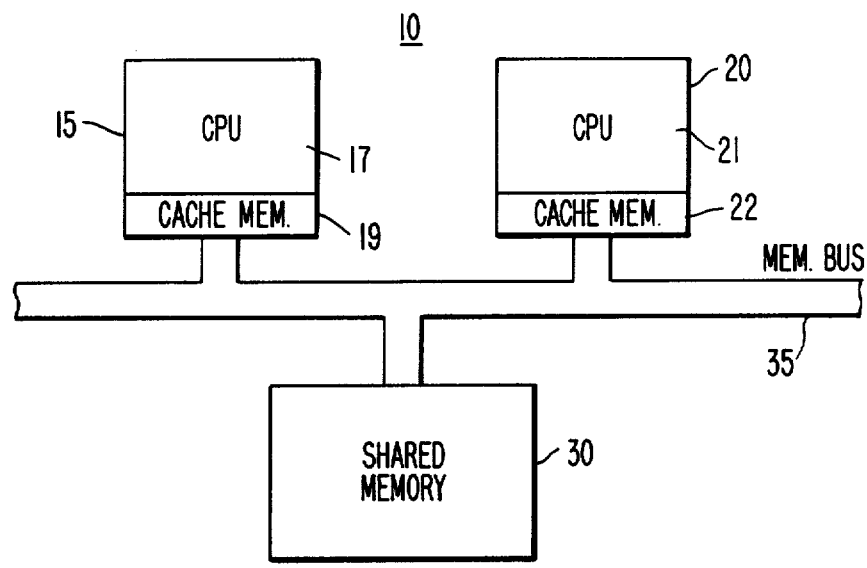
FIG. 1 shows a hardware configuration for implementing this invention.
Figure 2:
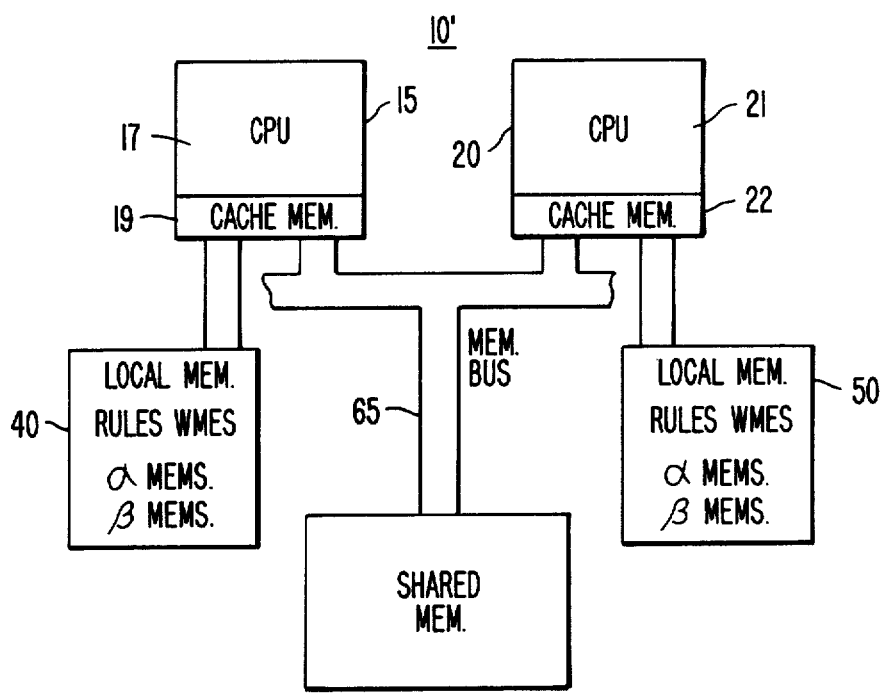
FIG. 2 shows a different hardware configuration for implementing the present invention.

FIGS. 1 and 2 show two hardware systems which can be used to implement the present invention. In its broadest aspects, however, the invention is not dependent upon the particular hardware systems employed. The objects of the present invention can be achieved using a variety of different hardware configurations as long as the present invention is practiced.

FIG. 1 shows one hardware configuration 10 containing two data processing systems 15 and 20, each of which contains a central processing unit, 17 and 21, respectively, and a cache memory unit, 19 and 22, respectively. The units are coupled to a large shared memory 30 containing, for example, 128 megabytes of storage, via a memory bus 35.

FIG. 2 shows an alternative hardware embodiment in which the same two data processing systems 15 and 20 are each connected to a local memory 40 and 50, respectively, as well as to a small shared memory 60 via memory bus 65. Both hardware configurations can be used to implement the method of this invention. The choice of the particular hardware configuration depends upon many considerations, such as circuit efficiencies, cost, and perhaps availability of hardware.

The memories shown in FIGS. 1 and 2 store WMEs and production rules. Preferably, the WMEs also include time tags which indicate when the particular element was created or last modified. The importance of time tags is explained in greater detail below in relation to the concept of priority and conflict resolution.

The production rules are stored as a set of conditions, possibly having condition tests. Typically the conditions specify a characteristic of certain WMEs and the condition tests specify further qualifications which a WME meeting the conditions must satisfy. For example, in a "voter" production rule, the condition may be "resident" and the condition test may be "age greater than 21." The operations in the production rules can be subroutines which would be executed if the production rule is chosen to "fire."

The memories also contain work queues. These are stacks of instructions to be performed by one or more processors. In addition, the memories may contain flags, such as for communicating between processors, data, such as floating point numbers, programs, such as programs for performing special functions, or special areas, such as communication areas.

The data and programs are stored in the different memories in accordance with a particular configuration. In FIG. 1, all data and programs are obviously stored in memory 30. In FIG. 2, each of the local memories 40 and 50 preferably contain all the production rules and WMEs, as well as alpha and beta memories which, as explained above, are created during the processing of the production rules. Shared memory 60 contains the work queues (with WME creation/delete instructions), flags (e.g., start-slave/finish-slave), floating point numbers, and communication areas.

Both FIGS. 1 and 2 show a parallel processing system having two processors, but more than two processors may be used in accordance with the method of this invention. The processors, however, must have access to the working memory elements and must be able to implement the production rules.

Prior to processing the production rules in accordance with the method of this invention, the processors must initialize themselves during start-up cycles. Preferably, start-up cycles are different for master and slave processors. It is possible for the master processor to remain a master processor and not participate in the operations carried out by the slave processors, but preferably the master processor becomes a slave processor during the parallel processing operation.

Preferably, the master processor is also preselected, although preselection is not required in accordance with this invention. The start-up routine for the master processor is shown as routine 100 in FIG. 3. As shown in FIG. 3, some instruction, for example, from an operator's console, generates a "run program" signal. This signal initiates the start-up sequence with a processor designated as a master (step 110). The master processor then begins certain system initialization steps, such as allocating memory to the shared memory areas and the local memory areas (step 120).

The master processor then loads the rules into its local memory (step 130) and clears a space in its local memory into which WMEs will be stored (step 140). Next, the master processor connects to shared memory (step 150). This connection generally involves well-known operating system commands which indicates to the operating system that other processors can access portions of the shared memory.

The master then performs an operation to determine that it is, in fact, the master (step 160). In the preferred implementation of this invention, all of the slave processors have the word "slave" in their name. The master processor checks its name to ensure that it does not contain the work "slave." The master then performs the start-up routine.

The start-up routine involves the storage of control flags in a control flag area (step 170). The control flags of interest in this implementation of the invention are a "GO" flag, which the master processor sets for the slave processors to begin certain operations, and a "DONE" flag, which the slave processors set when they finish those operations. After setting the control flags, the master processor starts or prompts each of the slave processors to begin their start-up routines (step 180).

FIG. 4 shows a flowchart for the preferred implementation of a slave start-up routine 200. Preferably, the slave processor performs the same initialization in step 210 as the master processor performed in step 120. Slave processors then load the rules into their own local memory (step 220) and clear a WME space in their local memories (step 230). Finally, the slave processors connect the shared memory to their processors (step 240) and then enter a wait state.

The master processor then resumes its start-up routine 100 and begins a start-up rule (step 190). In the start-up rule, the master processor sets several initial conditions. For example, the master processor generates "WME-create-instructions" so that any initial WMEs may be stored into the WME areas. In the preferred implementation, the master processor loads the work queue in the shared memory area with the WME-create-instructions (step 195). Those instructions contain "skeletons" of the WMEs as well as certain data to be placed into the skeletons to become WMEs. After the work queue is loaded with the WME instructions, a recognize-act cycle in accordance with the present invention can begin.

Figure 5:
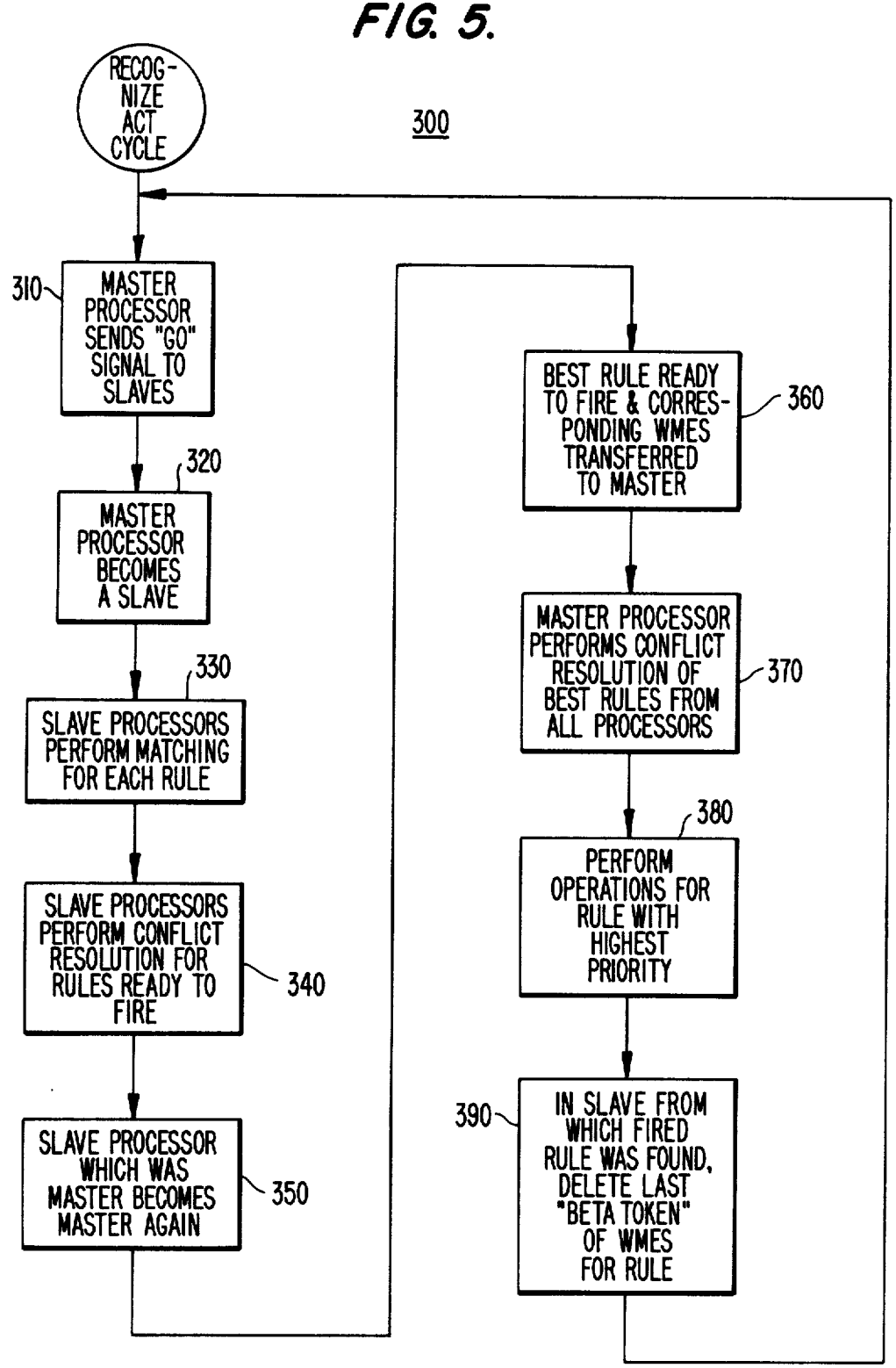
FIG. 5 is a flowchart containing the steps for implementing a recognize-act cycle in accordance with the present invention.
Figure 6:
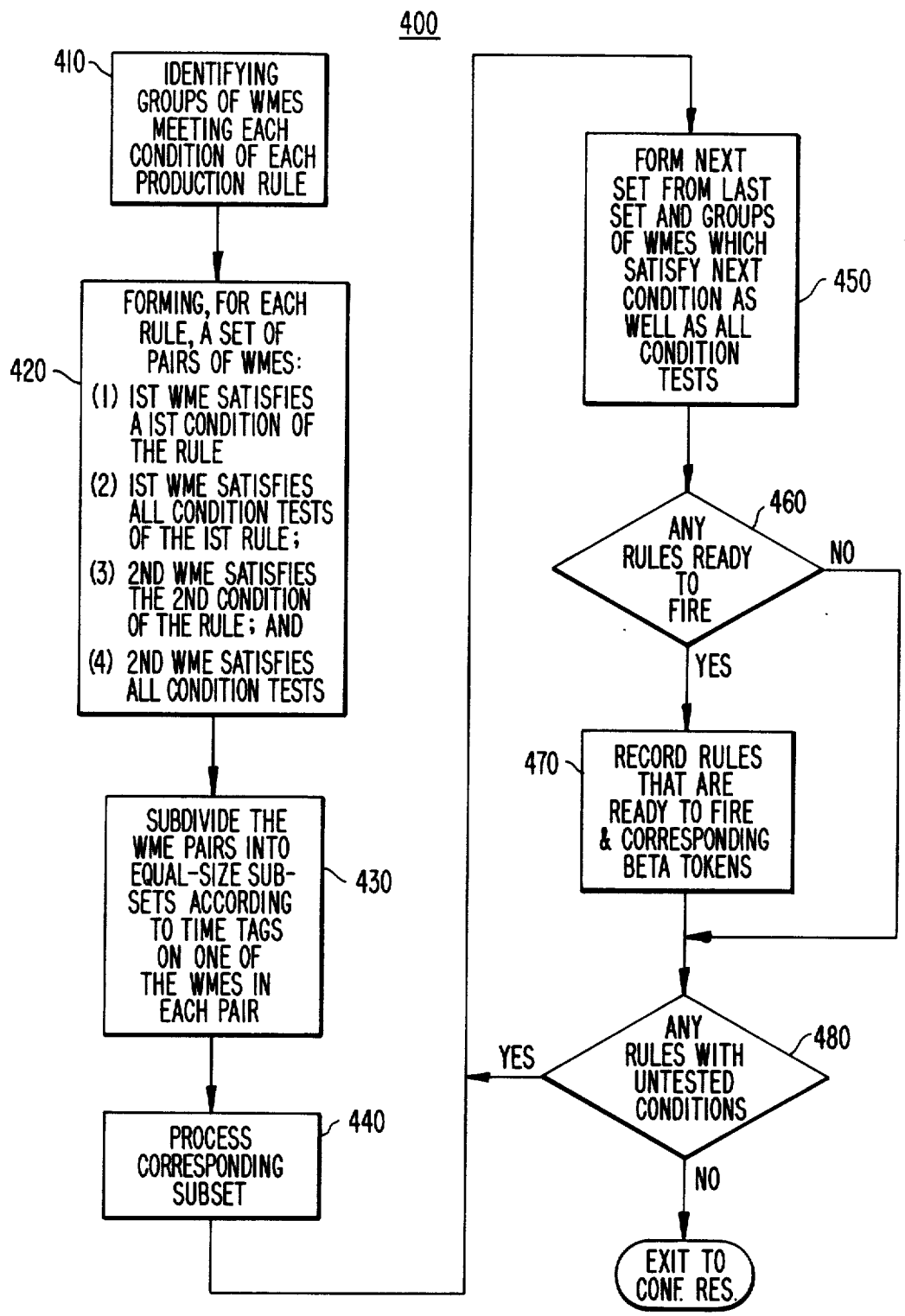
FIG. 6 is a flowchart containing the steps for implementing a production rule matching scheme in accordance with the present invention.

FIG. 5 shows the steps for preferred implementation of a recognize act cycle 300 in accordance with the present invention. Initially, the master processor sends a "GO" signal to the slaves (step 210). Preferably, this is accomplished by the master processor's setting the start slave flags in the shared memory area. Immediately after setting those flags the master processor becomes a slave processor itself (step 320). The slave processors then, substantially simultaneously, begin a matching operation for each production rule. The detailed implementation of this matching is shown in FIG. 6 as matching algorithm 400.

Algorithm 400 begins with each of the processors, substantially simultaneously, identifying groups of the WMEs.

Each of those groups correspond to a unique one of the conditions of each of the production rules, and all of the elements in each group satisfy the corresponding condition. If several production rules have the same condition, which is not uncommon, there would still be only one working group for that condition.

Preferably, the identifying step occurs as the WMEs are created. Therefore, the first action taken by the slave processors after they begin, is to begin executing the instructions in the work queue. When the slave processors execute the WME-create-instructions, they also then test created WMEs against the different conditions in each of the rules and identify the groups containing that condition. It is also possible, in accordance with the invention, to prestore the initial WMEs and to implement the identification step by initially examining all of the prestored WMEs.

After the slave processors identify the groups, each processor, substantially simultaneously, forms for each rule a first set of pairs of WMEs from the groups of WMEs (step 420). The first sets are formed as follows:
 (1) The first condition for a fule must be satisfied by the WME(s) in one of the groups;

(2) The first WME must satisfy any condition tests associated with the first condition;

(3) The second condition for that same rule must also be satisfied by the WME(s) of a group which is usually a different group of WMEs than the group satisfying the first condition; and (4) The second WME must satisfy any condition tests associated with the second condition.

The conditions for each rule must be considered in a serial fashion for optimum implementation. Thus, in forming sets, a first condition must be satisfied before determining whether a second condition must be satisfied, and the second condition must be satisfied before determining whether a third condition is satisfied, etc. A corollary to the principle that optimization is achieved by the serial consideration of conditions is that any condition tests must only require analysis of WMEs that have met prior conditions or comparison to constant values. Since the subsequent conditions have not yet been analyzed, WMEs which meet those subsequent conditions have not yet been recognized by the system.

Next, each slave processor subdivides the first sets into approximately equal-size subsets substantially simultaneously (step 430). The subsets are unique and non-overlapping and each corresponds to a different slave processor. After subdivision, each of the processors will only form succeeding sets from the corresponding subsets.

Different subdivision schemes are possible in accordance with the present invention, but such schemes also should produce the subsets of substantially the same size. For example, subsets can be allocated subsequently in a "card dealing" algorithm. This algorithm employs modulo n division where n is the total number of processors. Thus, processor 1 corresponds to the first, $n+1$st, $2n+1$st, ... groups; processor 2 corresponds to the second, $n+2$d, $2n+2$d, ... groups, etc. Alternatively, the allocation scheme can be based upon the sizes of the subsets. In the preferred embodiment, the slave processors examine a digit, such as the last digit of the first WME in each subset, and allocate, according to that digit, elements of the first sets.

The slave processors then begin processing their corresponding subsets substantially simultaneously, but independent of each other (step 440).

A loop then begins in which each processor forms, from the groups of WMEs and substantially simultaneously, a sequence of next sets of WMEs. Each of the sequences is associated with at least one of the production rules. Furthermore, in each sequence, each next set corresponds to a unique one of the series of conditions for the associated production rule such that the series of conditions proceeds as in a corresponding manner to the sequence of next sets. Each of the sets in a sequence contains only WMEs from the immediately prior set of that sequence, as well as WMEs from the one of the groups which satisfy the condition to that set.

Because the slave processors are only working with a subset of first sets, (hence, subset of "beta tokens"), the processing of the rules is divided relatively equally among the slave processors and the processing can be accelerated considerably. Furthermore, such division requires very little interprocessor communication. The slave processors are are looking at every rule and all have access to every group of WMEs.

After each next set is formed, the processors determine whether there are any rules ready to fire (step 460). A rule is ready to fire when there exists a set containing WMEs which satisfy all of the conditions and condition tests of the associated production rule. If no production rule is ready to fire, then a check for rules containing untested conditions is performed as described below (in step 480).

If a slave processor finds a production rule which is ready to fire, that processor records that rule, along with the corresponding set of WMEs which satisfy conditions of that rule (step 470).

The matching algorithm described above can be further optimized by permitting the processors to remember (store and access) from a first recognize-act cycle to a next, the sets of WMEs or "beta tokens" which partially or completely match the condition of the production rules. Thus, preferably, the sets WMEs available to the processors are updated incrementally during the next recognize-act cycle only to reflect the creation, modification, or deletion of WMEs performed after the end of the first recognize-act cycle. This technique for optimizing a matching algorithm is described in the article by Forgy on Rete, cited earlier.

After recording rules which are ready to fire, or after the processor has determined that no rules are ready to fire, the processor determines whether any production rules remain with conditions that have not yet been tested (step 480). This step addresses the situation in which the different production rules have different numbers of conditions. In such situations, certain production rules will have all of their conditions tested before all of the production rules' conditions are tested. If such production rules remain, then the slave processor repeats step 450 and forms the next set of WMEs. If the slave processor has tested all of the conditions in all the rules, then the matching algorithm is finished for that slave processor.

In algorithm 400 the slave processors subdivide the sets into subsets after forming the first sets containing pairs of WMEs. The subdivision however, need not be performed at that point. The subdivision into subsets can occur after later sets are formed. It may also be advantageous to subdivide into subsets at different times which are determined according to the production rules being processed. In such a case, the production rules would contain an indication of the number of conditions (i.e., at what level) that should be tested before division into subsets. In such a case, the slave processors would subdivide, for a rule, at the level indicated by the associated production rule.

Figure 7:
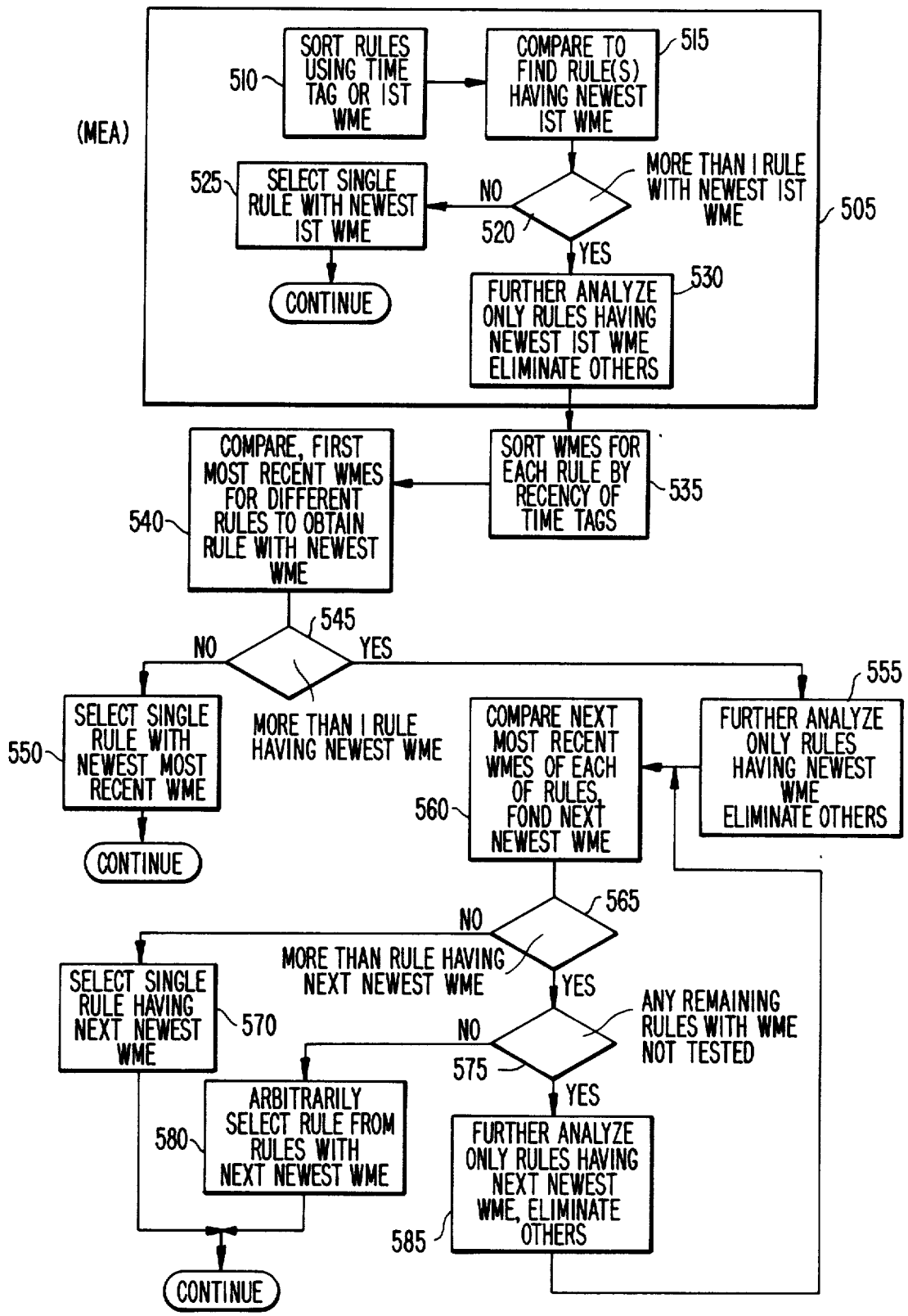
FIG. 7 is a flowchart containing the steps for implementing a conflict resolution scheme in accordance with the present invention.

As shown in FIG. 5, after the matching is completed, each slave processor must perform conflict resolution of the rules which are ready to fire (step 340). Preferably, this is done using the time tags of WMEs which cause the rules to fire. The detailed diagram of a conflict resolution algorithm is shown in FIG. 7 as method 500.

Conflict resolution occurs because it is likely that more than one set of WMEs may cause a particular rule to fire, and it is also possible that several rules are also ready to fire. Since in accordance with the protocol, only one rule can fire for each cycle, some priority scheme must be used to determine which rules should fire. Method 500 implements both a means ends analysis (MEA) (step 505) conflict resolution and "lexicographical" (LEX) conflict resolution in its entirety.

MEA conflict resolution presumes that the priority of any rule depends most importantly on the satisfaction of the first condition in that rule. Accordingly, to begin conflict resolution, each processor sorts the ones of its rules which are ready to fire by analyzing the time tag on the WMEs which meet the first condition ("1st WMEs"). Each processor gives highest priority, among 1st WMEs to the 1st WME having the most recent time tag (step 510). The most recent time tags for the 1st WMEs of the different rules are then compared to determine the rule with the 1st WME having the most recent time tags (step 515).

For example, assume a first rule with time tags 3, 2, 1 for its first, second and third WMEs, respectively, and a second rule with time tags 4, 2, and 1 for its first, second and third conditions, respectively.

After sorting according to the time tags of the 1st WMEs, (step 510), time tags 3 and 4 of rules 1 and 2, respectively, are compared to determine which of those tags is most recent (step 515). Rule 2 has the most recent time tag for a 1st WME, time tag 4, of the most recent time tags for the rules. Next, the processor sees if, among rules, there is more than one of its "ready-to-fire" rules having a WME with the most recent time tag for a 1st WME (step 520). In the example given, the processor sees if there is more than one rule which has time tag 4. If not, then rule 2 is the rule which becomes the "rule to fire" and the conflict resolution is over (step 525). Otherwise, only the rules having 1st WMEs with the most recent time tags satisfying the first condition are analyzed further (step 530).

The rules having the newest time tags are subsequently analyzed using LEX conflict resolution. In fact, a processor may begin conflict resolution subsequent to step 530 relying completely on LEX conflict resolution. In such a case, all rules are analyzed, not just rules having the most recent 1st WME.

WMEs for each rule for which all conditions have been satisfied are sorted according to recency (i.e., most recent to least recent) of time tags (step 535). The processor determines which of the time tags for the condition-satisfying WMEs of each rule is most recent, and which of the time tags is next most recent. The processor does this for all of the time tags in a rule. The time tags which are the most recent (called the "first most recent" time tags) for the rules are then compared. The rules having the first most recent time which is newest (i.e., most recent) has the highest priority (step 540).

For example, assume a first rule with time tags 9, 6 and 7 and a second rule with time tags 3, 8 and 1, and assume that the processor determines that the order of recency for the tags of rule 1 is 9, 7 and 6 and 8, 3 and 1 for rule 2. The first most recent tags are 9 and 8 for rules 1 and 2, respectively. The processor then compares first most recent time tags for different rules to determine a newest time tag (step 540). In the example, the processor determines that, as between the first most recent time tags for rules 1 and 2, rule 1 has the "newest" first most recent tag, time tag 9.

Thereafter, the processor determines whether, among the rules it is evaluating, there is more than one rule having the value of the "newest" time tag (step 545). In the example, the processor would check whether more than a single rule has tag 9 as its first most recent time tag. If not, then the rule with the newest time tag is the rule which become the "rule to fire" (step 550), and conflict resolution concludes. Otherwise, any rules which do not have a WME with the "newest" time tag value are eliminated from further consideration (step 555).

Subsequently, the next most recent time tags for each rule are compared against each other to obtain the next newest tag (step 560). In the example, if both rules had a 9 as the newest tag, the processor would evaluate next newest tags 7 and 3, for rules 1 and 2, respectively, and see that rule 1 had the next newest tag 7.

Again, the processor would test the remaining rules to determine whether more than one rule had a WME with the "next newest" tag (step 565). If not, the rule with a WME having the "next newest tag" becomes the "rule to fire" and conflict resolution ends (step 570). If, however, more than one rule having a WME with the next newest time tag exist, these rules are checked by the processor to determine whether any WMEs remain whose time tags have not been analyzed (step 575). If not, the processor makes an arbitrary selection of a rule to fire from among the remaining rules (step 580).

If WMEs with unanalyzed time tags remain only the rules having the "next newest" time tags are analyzed, and the other rules are eliminated from consideration (step 585). An analysis of the WMEs with the "next newest" tags occurs with the loop of steps 560, 565, and 575 and 585 until only one rule has a WME with a "next newest" time tag or until no WMEs remain to be analyzed and an arbitrary selection of rules is made. When the processor finds a single rule having a next newest time tag, that rule is selected at the "rule to fire" and conflict resolution ends.

Method 500 used both the recency of time tags and the number of condition tests for each of the rules in order to determine priority and to select which rule would be the rule from the particular processor to fire. It is also possible to have use another attribute of the rules ready to fire, such as looking for particular conditions in each one of the rules.

When the processor finishes conflict resolution step 340, it sets its DONE flag in the shared memory area. The master processor, when it completes action as a slave processor, monitors such flags and determines when all of the slave processors have set their DONE flags. At that point the master processor resumes its status as master (step 350).

Then each slave processor communicates to the master processors the production rule which is ready to fire and which has the highest priority. If a slave processor has no rules ready to fire, it will communicate this information to the master processor.

The slave processors then enter a wait state and the master processor implements a conflict resolution method to determine which of the production rules from each of the processors has the highest priority (step 370). Preferably, the conflict resolution method 500 in FIG. 7 is employed for this purpose also. The master processor then performs the operations for the chosen production rule, which has the highest priority of the rules of all of the processors (step 380).

The operations performed could involve several different actions. If the action is the creation or deletion of a WME, then, rather than actually creating the WMEs, the instructions for creation or deletion are placed on the work queue for later execution by each of the slave processors.

The operations performed could also involve reading or writing to a file. This reading or writing is the method by which input and output is effected. Another operation could be a halt operation which stops the machine. The machine would also stop if no rules was ready to fire during the recognized-act cycle 300, or if the processors were halted externally.

After a production rule fires (i.e. after the operations are performed), the master processor identifies the slave processor which sent the rule that was fired. The master processor then causes that slave processor to erase the "beta token." This erasure prevents an endless loop in which the same rule continuously fires. It should be noted that only the "beta token" corresponding to conditions of the rule, as satisfied, is erased. The rule remains available to be satisfied by other WMEs and the WMEs themselves remain available to satisfy other rules.

It will be apparent to those skilled in the art that modifications and variations can be made in the method of this invention by persons of ordinary skill in the art. The invention in its broader aspects is not limited to specific details, representative methods and apparatus, and illustrative examples shown and described. Departure may be made from such details without departing from the spirit or scope of the general inventive concept.

We claim:

1. A method for operating a parallel processing system having a plurality of processors, said processors having access to working memory elements to be examined and said processors implementing production rules specifying operations to be performed when a series of conditions are satisfied by specified ones of the working memory elements, the method comprising the steps of:
   identifying, by each said processor substantially simultaneously, groups of said working memory elements, each of said groups corresponding to a unique one of the conditions of each of said production rules such that all of the elements in each group satisfy the corresponding condition;
   forming, by each said processor substantially simultaneously and from said groups of working memory elements, first sets of pairs of said working memory elements, each of said first sets corresponding to a unique one of said production rules the elements in each of the pairs in said first sets respectively satisfying first and second conditions of the corresponding production rule;
   forming, by each said processor substantially simultaneously and from said groups of working memory elements, sequences of next sets of said working memory elements, each said sequence being associated with at least one of said production rules such that each said next set in each said sequence corresponds to a next one of the series of conditions for the associated production rules, each of said next sets in each of said sequences containing working memory elements contained in a prior set in that sequence as well as working memory elements from said groups which satisfy the corresponding condition in the associated production rule;
   subdividing, by each said processor substantially simultaneously, a selected one of said first sets or said next sets into N unique, nonoverlapping subsets where N is no greater than the number of processors, each of said subsets corresponding to one of said processors, each said processor only forming the next sets in each sequence succeeding said corresponding subset; and
   performing all of the operations specified by one of the production rules for which all conditions have been satisfied.

2. The method of claim 1 further including the steps of:
   determining, by each said processor, ready ones of said production rules for which that processor has formed a first set or a next set satisfying all of said conditions of the rules;
   choosing, by each said processor, one of the ready production rules;
   communicating the chosen production rules from said processors to a priority determination element; and
   selecting, by said priority determination element, one of said chosen production rules according to a predetermined priority scheme, to obtain a selected production rule.

3. The method of claim 2 wherein said selecting step is performed by a one of said processors.

4. The method of claim 3 wherein said priority determination element is said one processor.

5. The method of claim 2 wherein the step of performing the specified operations includes the step of performing the operations specified by the selected production rule.

6. The method of claim 5 wherein each of said working memory elements includes a time tag;
   wherein said communicating step includes the step of communicating information about the working memory elements which satisfy the chosen production rules; and
   wherein said selecting step includes the step of using a priority scheme based on the time tags in the working memory elements satisfying the chosen production rules.

7. The method of claim 6 wherein said choosing step includes the step of comparing to each other the time tags of the working memory elements satisfying the ready production rules.

8. The method of claim 7 wherein said subdividing step includes the step of assigning subsets to processors according to the time tags in at least one working memory element in the subsets.

9. The method of claim 1 wherein said operations performing step is performed by a master processor.

10. The method of claim 9 wherein said master processor is one of said plurality of processors.

11. The method of claim 1 wherein the sequence of steps of claim 1 are repeated.

12. The method of claim 1 wherein said processes each have a local memory, and wherein said method includes the step of storing said working memory elements and said production rules into said local memories.

13. The method of claim 1 wherein said processors each have a local memory and are coupled to a shared memory, and wherein said method further includes the steps of:
   storing certain of said working memory elements and said production rules into said local memories; and
   storing the other of said working memory elements and said production rules into said shared memory.

14. The method of claim 1 wherein said step of subdividing occurs after the step of forming said first sets and before the step of forming said sequences of next sets.

15. The method of claim 1 wherein said production rules each indicate a level of subdivision corresponding to one of the series of conditions for that rule, and wherein for each rule said step of subdividing for each rule occurs at the level indicated for that production rule.

16. The method of claim 1 wherein certain of said conditions include condition tests, and wherein the forming steps each include the step of ensuring that the ones of said working memory elements satisfying the conditions including condition tests also meet said condition tests.

17. The method of claim 1 wherein said step of subdividing said sets includes the step of classifying said sets into the same number of classes as the number of processors according to a characteristic of the next sets such that each of said classes corresponds to one of said processors.

18. The method of claim 17 wherein the step of classifying said sets is performed in accordance with a characteristic of said working memory elements of the sets being classified.

19. A parallel processing system having a plurality of processors, said processors having access to working memory elements to be examined and said processors implementing production rules specifying operations to be performed when a series of conditions are satisfied by specified ones of the working memory elements, the system comprising:
 a plurality of identifying means for identifying, by each said processor substantially simultaneously, groups of said working memory elements, each of said groups corresponding to a unique one of the conditions of each of said production rules such that all of the elements in each group satisfy the corresponding condition;
 a plurality of first forming means for forming, by each said processor substantially simultaneously and from said groups of working memory elements, first sets of pairs of said working memory elements, each of said first sets corresponding to a unique one of said production rules, the elements in each of the pairs in said first sets respectively satisfying first and second conditions of the corresponding production rule;
 a plurality of second forming means for forming, by each said processor substantially simultaneously and from said groups of working memory elements, sequences of next sets of said working elements, each said sequence being associated with at least one of said production rules such that each said next set in each said sequence corresponds to a next one of the series of conditions for the associated production rules, each of next said set in each of said sequences containing working memory elements contained in a prior set in that sequence as well as working memory elements from said groups which satisfy the corresponding condition in the associated production rule;
 a plurality of subdividing means for subdividing, by each said processor substantially simultaneously, a selected one of said first sets or said next sets into N unique, nonoverlapping subsets where N is no greater than the number of processors, each of said subsets corresponding to one of said processors, each said processor only forming the next sets in each sequence succeeding said corresponding subset; and
 performing means for performing all of the operations specified by one of the production rules for which all conditions have been satisfied.

20. The system of claim 19 further including:
 a plurality of determining means for determining, by each said processor, ready ones of said production rules for which that processor has formed a first set or a next set satisfying all of said conditions of the rules;
 a plurality of choosing means for choosing, by each said processor, one of the ready production rules;
 communication means for communicating the chosen production rules from said processors; and
 priority determination means for selecting one of said chosen production rules from said communication means according to a predetermined priority scheme, to obtain a selected production rule.

21. The system of claim 20 wherein said priority determination means is one of said processors.

22. The system of claim 20 wherein the performing means includes means for performing the operations specified by the selected production rule.

23. The system of claim 22 wherein each of said working memory elements includes a time tag;
 wherein said communication means includes means for communicating information about the working memory elements which satisfy the chosen production rules; and
 wherein the priority scheme of said priority determination means is based on the time tags in the working memory elements satisfying the chosen production rules.

24. The system of claim 23 wherein said choosing means each include means for comparing to each other the time tags of the working memory elements satisfying the production rules.

25. The system of claim 24 wherein said subdividing means each include means for assigning subsets to processors according to the time tags in at least one working memory element in the subsets.

26. The system of claim 19 wherein said performing means is located in a master processor.

27. The system of claim 26 wherein said master processor is one of said plurality of processors.

28. The system of claim 19 wherein said processors each have a local memory, and wherein said system includes storing means for storing said working memory elements and said production rules into said local memories.

29. The system of claim 19 wherein said processors each have a local memory and are coupled to a shared memory, and wherein said system further includes:
 first storing means for storing certain of said working memory elements and said production rules into said local memories; and
 second storing means for storing the other of said working memory elements and said production rules into said shared memory.

30. The system of claim 19 wherein said production rules each indicate a level of subdivision corresponding to one of the series of conditions for that rule, and wherein for each rule said subdividing means subdivide the sets for each rule at the level indicated for that production rule.

31. The system of claim 19 wherein certain of said conditions include condition tests, and wherein the first and second forming means each include an element for ensuring that the ones of said working memory elements satisfying the conditions including condition tests also meet said condition tests.

32. The system of claim 19 wherein the subdividing means each include means for classifying said sets into the same number of classes as the number of processors according to a characteristic of the next sets such that each of said classes corresponds to one of said processors.

33. The system of claim 32 wherein said classifying means classify said sets in accordance with a characteristic of said working memory elements of the sets being classified.

34. A computer processing means for operating a processor in a parallel processing system having a plurality of processors, said processors having access to working memory elements to be examined and said processors implementing production rules specifying operations to be performed when a series of conditions are satisfied by specified ones of the working memory elements, the processing means comprising:

identifying means for identifying, substantially simultaneously with the other said processors, groups of said working memory elements, each of said groups corresponding to a unique one of the conditions of each of said production rules such that all of the elements in each group satisfy the corresponding condition;

first forming means for forming, substantially simultaneously with the other said processors and from said groups of working memory elements, first sets of pairs of said working memory elements, each of said sets corresponding to a unique one of said production rules, the elements in each of the pairs in said first sets respectively satisfying first and second conditions of the corresponding production rule;

second forming means for forming, substantially simultaneously with the other said processors and from said groups of working memory elements, sequences of next sets of said working elements, each said sequence being associated with at least one of said production rules such that each said next set in each said sequence corresponds to a next one of the series of conditions for the associated production rules, each of said next set in each of said sequences containing working memory elements contained in a prior set in that sequence as well as working memory elements from said groups which satisfy the corresponding condition in the associated production rule;

subdividing means for subdividing, substantially simultaneously with the other of said processors, a selected one of said first sets or said next sets into a unique subset, said processor only forming the next sets in each sequence succeeding said subset;

determining means for determining ready ones of said production rules for which said processor has formed a first set or a next set satisfying all of said conditions of the rules;

choosing means for choosing one of the ready production rules; and communication means for communicating the chosen production rules to priority determination means for selecting one of said chosen production rules.

35. The computer processing means of claim 34 wherein each of said working memory elements includes a time tag; and wherein said communication means includes means for communicating information about the working memory elements which satisfy the chosen production rules.

36. The computer processing means of claim 35 wherein said choosing means includes means for comparing to each other the time tags of the working memory elements satisfying the production rules.

37. The computer processing means of claim 36 wherein said subdividing means includes means for assigning a subset to the processor according to the time tags in at least one working memory element in the subset.

38. The computer processing means of claim 34 wherein said production rules each indicate a level of subdivision corresponding to one of the series of conditions for that rule, and wherein for each rule said subdividing means subdivides the sets for each rule at the level indicated for that production rule.

39. The computer processing means of claim 34 wherein certain of said conditions include condition tests, and wherein the first and second forming means each include means for ensuring that the ones of said working memory elements satisfying the conditions including condition tests also meet said condition tests.

40. The computer processing means of claim 34 wherein the subdividing means includes means for classifying said sets into classes according to a characteristic of said working memory elements of the sets being classified.

* * * * *